(12) United States Patent
Rasanen

(10) Patent No.: US 8,356,092 B2
(45) Date of Patent: Jan. 15, 2013

(54) METHODS, APPARATUSES, SYSTEM, AND RELATED COMPUTER PROGRAM PRODUCT FOR POLICY CONTROL

(75) Inventor: Juha Antero Rasanen, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 273 days.

(21) Appl. No.: 12/681,830

(22) PCT Filed: Sep. 9, 2008

(86) PCT No.: PCT/EP2008/061915
§ 371 (c)(1),
(2), (4) Date: Jun. 28, 2010

(87) PCT Pub. No.: WO2009/047065
PCT Pub. Date: Apr. 16, 2009

(65) Prior Publication Data
US 2010/0268763 A1    Oct. 21, 2010

(30) Foreign Application Priority Data
Oct. 8, 2007   (EP) ..................................... 07118044

(51) Int. Cl.
G06F 15/173    (2006.01)

(52) U.S. Cl. ........ 709/223; 709/224; 709/231; 709/232; 370/328; 370/389; 370/401

(58) Field of Classification Search .................. 709/203, 709/217, 219, 223, 224, 229, 231, 232; 370/328, 370/338, 389, 401
See application file for complete search history.

(56) References Cited

U.S. PATENT DOCUMENTS

| | | | | |
|---|---|---|---|---|
| 6,985,440 B1 * | 1/2006 | Albert et al. | ................... | 370/230 |
| 7,822,046 B2 * | 10/2010 | Wing et al. | ................... | 370/401 |
| RE43,057 E * | 1/2012 | Molitor | .......................... | 370/401 |
| 2003/0133459 A1 * | 7/2003 | Siddiqui et al. | .......... | 370/395.21 |
| 2005/0238005 A1 * | 10/2005 | Chen et al. | ..................... | 370/389 |
| 2007/0076729 A1 * | 4/2007 | Takeda | .......................... | 370/401 |
| 2007/0156919 A1 * | 7/2007 | Potti et al. | ..................... | 709/238 |
| 2007/0189311 A1 * | 8/2007 | Kim et al. | ..................... | 370/401 |
| 2008/0159313 A1 * | 7/2008 | Rasanen | ....................... | 370/401 |
| 2008/0253368 A1 * | 10/2008 | Rasanen | ....................... | 370/389 |
| 2009/0055543 A1 * | 2/2009 | Rasanen | ....................... | 709/228 |

OTHER PUBLICATIONS

"Digital cellular telecommunications system (Phase 2+); Universal Mobile Telecommunications System (UMTS); IP Multimedia Subsystem (IMS); Stage 2 (3GPP TS 23.228 version 7.8.0 Release 7); ETSI TS 123 228" ETSI Standards, European Telecommunications Standards Institute, Sophia-Antipo, FR, vol. 3-SA2, No. V780, Jun. 2007, XP014037759, 223 pages.

(Continued)

*Primary Examiner* — Lashonda Jacobs
(74) *Attorney, Agent, or Firm* — Harrington & Smith

(57) ABSTRACT

It is disclosed a method including receiving first address information relating to a terminal and a network traffic relay entity, obtaining second address information relating to the network traffic relay entity and a network traffic destination entity, and sending the first address information and the second address information to a controlling entity; and a method including receiving the first and second address information, generating policy information based on the received first and second address information, and monitoring network traffic based on the generated policy information.

24 Claims, 6 Drawing Sheets

OTHER PUBLICATIONS

"Universal Mobile Telecommunications System (UMTS); Policy and charging control over Rx reference point (3GPP TS 29.214 version 7.1.0 Release 7); ETSI TS 129 214" ETSI Standards, European Telecommunications Standards Institute, Sophia-Antipo, FR, vol. 3-CT3, No. V710, Jun. 2007, XP014038182, 35 pages.

Wing Cisco Systems D: "Media Session Authorization; draft-wing-session-auth-00.txt" IETF Standard-Working-Draft, Internet Engineering Task Force, IETF, CH, Jan. 31, 2006, XP015044715, 15 pages.

Rosenberg Cisco J: "Interactive Connectivity Establishment (ICE): A Protocol for Network Address Translator (NAT) Traversal for Offer/Answer Protocols; draft-ietf-mmusic-ice-17.txt" IETF Standard-working-Draft, Internet Engineering Task Force, IETF, CH, vol. music, No. 17, Jul. 9, 2007, XP015051452, 21 pages.

3GPP TS 24.229 V7.8.0 (Jun. 2007) Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 7), 423 pages.

Traversal Using Relays around NAT (TURN): Relay Extensions to Session Traversal Utilities for NAT (STUN) draft-ietf-behave-turn-04.txt Rosenberg et. al. Aug. 7, 2007; Internet-Draft, 27 pages.

* cited by examiner

METHODS, APPARATUSES, SYSTEM, AND RELATED COMPUTER PROGRAM PRODUCT FOR POLICY CONTROL

FIELD OF THE INVENTION

The present invention relates to policy control e.g. in PS (data packet switched) data networks. More specifically, the present invention relates to methods, apparatuses, a system and a related computer program product e.g. related to PCC (Policy and charging control) when e.g. a STUN (Simple Traversal of UDP (User Datagram Protocol) over NATs ((network address translations))) Relay is used for IMS (IP (Internet Protocol) Multimedia Subsystem) access NAT traversal.

BACKGROUND

In 3GPP (3$^{rd}$ Generation Partnership Project), there have been discussions related to policy control.

Namely, 3GPP has defined (e.g. from Release 6 onwards) an ALG (application level gateway) and NAT-GW (NAT gateway) based method for traversal of uncontrolled access network NATs, refer e.g. to 3GPP TS (technical specification) 23.228, Annex G, and TS 24.229.

In case a NAT device is interposed between a UE and an IMS core network, e.g. the AF/P-CSCF (application function/proxy call session control function) is configured to determine the existence of the NAT device e.g. by comparing the IP addresses in received SIP/SDP (session initiation protocol/session description protocol) messages. The SIP/SDP fields may contain the private domain IP address of the UE, while the data packets pass the NAT device and a sender may seem to have the public IP address allocated by the NAT device. Consequently, the ALG functionality in conjunction with the AF/P-CSCF may request public addresses from the NAT-GW and may modify the SIP/SDP accordingly before sending the message forward, and further, the ALG/AF/P-CSCF may initiate proper security measures (e.g. IP Sec tunneling) for the SIP signalling to be able to traverse the NAT device.

However, for example, the ALG and NAT-GW method imposes limitations:

The UE shall send a media data packet first (i.e. before the UE can receive media data packets) in order to have the NAT allocate an address and to let the NAT-GW get the address and use it as a destination address for downlink media data packets.

The NAT releases the allocated address, if there is no traffic. Applications may have to send keep-alive messages.

When the UE is using e.g. visited network's services, media path is looped via the home network, if/when the home network's P-CSCF is used.

Traversal of all types of NATs cannot be supported.

To overcome the above-mentioned limitations related to the ALG and NAT-GW method, 3GPP has enhanced the NAT traversal methodology e.g. in Release 7 specifications with IETF (internet engineering task force) originated STUN (simple traversal of UDP (user datagram protocol) through NATs) and STUN relay based mechanisms, refer e.g. to 3GPP TS 23.228, Annex G.

With these methods, the UE may be able to get an external/public IP address by an inquiry to a STUN server and to insert the external/public address in the SIP/SDP level, thus making the ALG and NAT-GW functionality redundant, in addition to removing e.g. NAT type related and incoming session invitation related limitations of the ALG and NAT-GW method.

For example, FIG. 1 shows a reference model for ICE (interactive connectivity establishment) and Outbound Methodology in order to provide a general overview and architecture of IMS access with a NAT.

As shown in FIG. 1, a communication system 100 comprises a UE 101, a remote UE 101' and a network 102. The network 102 in turn comprises an optional NAT and FW (firewall) 1021, an optional remote NAT and FW 1021', a P-CSCF 1022, a PCRF (policy and/or charging rules function) 1023, a PCEF (policy and/or charging enforcement function) 1024, a STUN relay 1025, a STUN server 1025a, an S-CSCF (serving CSCF) 1026 and an optional IMS access gateway 1027. The UE 101 and the remote UE 101' comprise each ICE support by means of a STUN client/server. The UE 101 additionally comprises outbound support by means of a STUN client.

The STUN Function shown within the P-CSCF 1022 is a limited STUN Server for supporting so-called STUN keep-alive messages as described e.g. in TS 23.228, clause G.5.3.2.

For deployments where the IMS Access gateway 1027 (or other media manipulating functional entities, such as a MRFP (Multimedia Resource Function Processor)) is used, such functional entities shall be placed on the network side of the STUN server 1025a and STUN relay server 1025 (i.e. not between the UE 101 and the STUN server 1025a or STUN relay server 1025) as shown in FIG. 1. Otherwise, such functional entities will prevent STUN messages from reaching the STUN Relay 1025/Server 1025a e.g. outside of a session.

FIG. 2 shows an explanatory view of the so-called tuple terminology to be explained herein below (refer e.g. to IETF draft-ietf-behave-turn-04.txt). As shown in FIG. 2, a UE (or STUN Client) 201 may perform data communication (or network traffic) with a STUN Relay (or STUN Server) 2025 e.g. via an optional NAT 2021. An address relationship between the UE 201 (or NAT 2021, if present) and the STUN Relay 2025 may be referred to as "internal 5-tuple". The internal 5-tuple may comprise a source address and port of the UE 201 (in conjunction with the NAT 2021, if present), a destination address and port of the STUN Relay 2025 and a protocol to be used between the UE 201 and the STUN Relay 2025.

As further shown in FIG. 2, the STUN Relay (or Server) 2025 may relay the data communication from the UE 201 to an external client 203 or another optional external client 203'. An address relationship between the STUN Relay 2025 and the external client 203 (or 203') may be referred to as "external 5-tuple". The external 5-tuple may comprise a source address and port of the STUN Relay 2025, a destination address and port of the external client 203 (or 203') and a protocol to be used between STUN Relay 2025 and the external client 203 (or 203').

In addition, the STUN Relay 2025 functionality may transfer media and STUN messages between the UE 201 (in conjunction with the related NAT 2021 device, if present) and the STUN Relay 2025 using the internal 5-Tuple as described above. The idea resides in using the same internal 5-tuple IP addresses and ports for all DP (data packet) transmissions to enable the traversal of all kinds of NATs. There are supported two ways for this purpose:

Media streams can be encapsulated e.g. within a STUN message in Send Indication or Data Indication between the UE 201 and the STUN Relay 2025 using the IP addresses and ports of the internal 5-Tuple, i.e. an "encapsulation protocol" is used. The encapsulation may contain the external IP address and port of the far end party (such as the external client 203 or 203') communicating with the UE 201.

Another way resides in a so-called "set an active destination", i.e. the UE 201 requests a certain external address to be used by the STUN Server 2025 for all media transmission that is not encapsulated in Send Indication or Data Indication, (i.e. the UE 201 tells the external address and port to the STUN Relay 2025 beforehand and then sends/receives data using the IP addresses of the internal 5-Tuple without having the address information of the external party in the data packets). This can be used for one external address/port pair at a time. If the UE 201 is intended to send or receive to/from another IP address/port this way, the UE 201 may be configured to deactivate the current active destination and to request for activation of the new IP address/port pair.

According to the above, when e.g. PCC (policy and charging control) is applied in an IMS network to a session using the STUN Relay 2025, a PCEF (policy and charging enforcement point) is unable to recognize e.g. the media streams or service data flows on the user plane due to the encapsulation protocol between the UE 201 and the STUN Relay 2025, and especially, the PCEF 2024 does not know which media stream is possibly using the "active destination" method. (The UE 201 may be able to change the active destination during the session by sending a request to the STUN Relay 2025, e.g. in a multimedia session when the media stream benefiting from optimized transmission changes). Consequently, the PCEF is unable to correctly apply policy and charging control to media streams or service data flows.

Furthermore, according to the above, if e.g. port numbers of the Server Reflexive Address are used for separating media flows from each other, there resides a problem in that the UE 201 may circumvent the policy and charging control.

In consideration of the above, it is an object of the present invention to overcome one or more of the above drawbacks. In particular, the present invention provides methods, apparatuses, a system and a related computer program product for policy control.

According to the present invention, in a first aspect, this object is for example achieved by a method comprising:

receiving first address information relating to a terminal and a network traffic relay entity;

obtaining second address information relating to the network traffic relay entity and a network traffic destination entity; and sending the first address information and the second address information to a controlling entity.

According to further refinements of the invention as defined under the above first aspect, the receiving comprises receiving the first address information as at least a portion of a session initiation protocol invite message;

the obtaining comprises sending a session initiation protocol invite message relating to an intended network traffic destination entity, and receiving a session initiation response message relating to the network traffic destination entity responsive to the session initiation protocol invite.

According to the present invention, in a second aspect, this object is for example achieved by a method comprising:

receiving first address information relating to a terminal and a network traffic relay entity, and second address information relating to the network traffic relay entity and a network traffic destination entity;

generating policy information based on the received first and second address information; and monitoring network traffic based on the generated policy information.

According to further refinements of the invention as defined under the above second aspect, the generated policy information comprises a filter function for network traffic related to the first address information;

the generated policy information comprises at least one of a first filter function for network traffic related to network traffic in a direction from the terminal to the network traffic destination entity, and a second filter function for network traffic related to network traffic in a direction from the network traffic destination entity to the terminal;

the method further comprises detecting an intended change to another network traffic destination entity, and holding destination address information relating to the said other network traffic destination entity based on the detected change;

the method further comprises matching the address information against one of the first and second filter functions, and policy enforcement of the network traffic based on the result of matching;

the method further comprises first examining, if the result of matching is negative, whether a data packet is constituted by a simple traversal of user datagram protocol over network address translations request message comprising a source address of the terminal and indicating a network traffic destination entity, second examining, if the result of the first examining is affirmative, whether the indicated network traffic destination entity accords with at least one of the policy information and at least one of the first and second filter functions, and updating, if the result of the second examining is affirmative, the first and second filter functions with at least one of the source address and a port of the terminal;

the method further comprises examining, if the result of matching is negative, and if the data packet causes the network traffic relay entity to permit a new destination address, and, if the result of the examining indicates that the data packet causes the network traffic relay entity to permit a new destination address not matching at least one of the first and second filter functions, dropping the data packet;

the method further comprises examining, if the result of matching is negative, and if the data packet causes the network traffic relay entity to permit a new destination address, and, if the result of the examining indicates that the data packet causes the network traffic relay entity to permit a new destination address not matching at least one of the first and second filter functions, enforcing policy control measures to the data packet;

the method further comprises examining, if the result of matching is negative, and if the data packet is constituted by a simple traversal of user datagram protocol over network address translations message requesting a change of an active destination used by the network traffic relay entity for internet protocol data packets, and, if the result of the examining indicates that the data packet causes the change of the active destination and that the requested destination address does not match at least one of the first and second filter functions, dropping the data packet;

the method further comprises examining, if the result of matching is negative, and if the data packet is constituted by a simple traversal of user datagram protocol over network address translations message requesting a change of an active destination used by the network traffic relay entity for internet protocol data packets, and, if the result of the examining indicates that the data packet causes the change of the active destination and that the requested destination address does not match at least one of the first and second filter functions, enforcing policy control measures to the data packet;

the method further comprises, if the result of matching is affirmative, determining that the network traffic is non-encapsulated network traffic, and the policy enforcement is based on destinations of individual data packets within media streams, and routes the non-encapsulated network traffic based on the generated policy information and the held destination address information;

the method further comprises, if the result of matching is negative, determining that the network traffic is non-encapsulated network traffic, and the policy enforcement is based on destinations of individual data packets within media streams and restricts the non-encapsulated network traffic based on the generated policy information and the held destination address information;

the method further comprises determining whether the network traffic is encapsulated network traffic, and, if so, the policy enforcement is based on destinations of individual data packets on a data packet-by-data packet basis for enforcing policy on the encapsulated network traffic based on the generated policy information and the held destination address information.

According to further refinements of the invention as defined under the above first and second aspects, the first address information comprises at least one of a source address of the terminal, a source port of the terminal, a destination address of the network traffic relay entity, a destination port of the network traffic relay entity, a protocol to be used between the terminal and the network traffic relay entity, and a channel number relating to a media stream;

at least one of the source address of the terminal and the source port of the terminal further comprises network address translation information;

the second address information comprises at least one of a source address of the network traffic relay entity, a source port of the network traffic relay entity, a destination address of the network traffic destination entity, a destination port of the network traffic destination entity, a protocol to be used between the network traffic relay entity and the network traffic destination entity and a channel number of a media stream.

According to the present invention, in a third aspect, this object is for example achieved by an apparatus comprising:

means for receiving first address information relating to a terminal and a network traffic relay entity;

means for obtaining second address information relating to the network traffic relay entity and a network traffic destination entity; and means for sending the first address information and the second address information to a controlling entity.

According to further refinements of the invention as defined under the above third aspect, the means for receiving is further configured to receive the first address information as at least a portion of a session initiation protocol invite message;

the means for obtaining further comprises means for sending a session initiation protocol invite message relating to an intended network traffic destination entity, and means for receiving a session initiation response message relating to the network traffic destination entity responsive to the session initiation protocol invite.

According to the present invention, in a fourth aspect, this object is for example achieved by an apparatus comprising:

means for receiving first address information relating to a terminal and a network traffic relay entity, and second address information relating to the network traffic relay entity and a network traffic destination entity;

means for generating policy information based on the first and second address information received by the means for receiving; and means for monitoring network traffic based on the policy information generated by the means for generating.

According to further refinements of the invention as defined under the above fourth aspect, the means for generating is further configured to generate a filter function for network traffic related to the first address information;

the means for generating is further configured to generate at least one of a first filter function for network traffic related to network traffic in a direction from the terminal to the network traffic destination entity, and a second filter function for network traffic related to network traffic in a direction from the network traffic destination entity to the terminal;

the apparatus further comprises means for detecting an intended change to another network traffic destination entity, and means for holding destination address information relating to the said other network traffic destination entity based on the change detected by the means for detecting;

the apparatus further comprises means for matching the address information against one of the first and second filter functions, and means for policy enforcement of the network traffic based on the result of matching;

the apparatus further comprises means for examining, if the result of matching is negative, whether a data packet is constituted by a simple traversal of user datagram protocol over network address translations request message comprising a source address of the terminal and indicating a network traffic destination entity, and for examining, if the result of the examining of the data packet is affirmative, whether the indicated network traffic destination entity accords with at least one of the policy information and at least one for the first and second filter functions, and means for updating, if the result of the means for examining is affirmative, at least one of the first and second filter functions with at least one of the source address and a port of the terminal;

the apparatus further comprises means for examining, if the result of matching is negative, and if the data packet causes the network traffic relay entity to permit a new destination address, and means for dropping the data packet, if the result by the means for examining indicates that the data packet causes the network traffic relay entity to permit a new destination address not matching at least one of the first and second filter functions;

the apparatus further comprises means for examining, if the result of matching is negative, and if the data packet causes the network traffic relay entity to permit a new destination address, and means for enforcing policy control measures to the data packet, if the result by the means for examining indicates that the data packet causes the network traffic relay entity to permit a new destination address not matching at least one of the first and second filter functions;

the apparatus further comprises means for examining, if the result of matching is negative, and if the data packet is constituted by a simple traversal of user datagram protocol over network address translations message requesting a change of an active destination used by the network traffic relay entity for internet protocol data packets, and means for dropping the data packet, if the result by the means for examining indicates that the data packet requests the change of the active destination and the requested destination address does not match at least one of the first and second filter functions;

the apparatus further comprises means for examining, if the result of matching is negative, and if the data packet is constituted by a simple traversal of user datagram protocol over network address translations message requesting a change of an active destination used by the network traffic relay entity for internet protocol data packets, and means for enforcing policy control measures to the data packet, if the result by the means for examining indicates that the data packet requests the change of the active destination and the requested destination address does not match at least one of the first and second filter functions;

the apparatus further comprises means for determining configured to determine, if the result of matching is affirmative, that the network traffic is non-encapsulated network traffic, and wherein the means for policy enforcement is further configured to route based on destinations of individual data packets within media streams and to route the non-encapsulated network traffic based on the policy information generated by the means for generating and the destination address information held by the means for holding;

the apparatus further comprises means for determining configured to determine, if the result of matching is negative, that the network traffic is non-encapsulated network traffic, and wherein the means for policy enforcement is further configured to route based on destinations of individual data packets within media streams and to restrict the non-encapsulated network traffic based on the policy information generated by the means for generating and the destination address information;

the apparatus further comprises means for determining whether the network traffic is encapsulated network traffic, and, if so, the means for policy enforcement is further configured to enforce policy on destinations of individual data packets on a data packet-by-data packet basis for enforcing policy on the encapsulated network traffic based on the policy information generated by the means for generating and the destination address information held by the means for holding.

According to further refinements of the invention as defined under the above third and fourth aspects, the first address information comprises at least one of a source address of the terminal, a source port of the terminal, a destination address of the network traffic relay entity, a destination port of the network traffic relay entity, a protocol to be used between the terminal and the network traffic relay entity and a channel number relating to a media stream;

at least one of the source address of the terminal and the source port of the terminal further comprises network address translation information;

the second address information comprises at least one of a source address of the network traffic relay entity, a source port of the network traffic relay entity, a destination address of the network traffic destination entity, a destination port of the network traffic destination entity, a protocol to be used between the network traffic relay entity and the network traffic destination entity and a channel number relating to a media stream;

the terminal is constituted by a user equipment;

the network traffic relay entity is constituted by a simple traversal of user datagram protocol through network address translations relay server;

the network traffic destination entity is constituted by an external client;

the apparatus according to the third aspect is constituted by at least one of an application function and a proxy call session control function;

the apparatus according to the fourth aspect is constituted by at least one of a gateway function, a policy and charging rules function and a policy and charging enforcement function;

the apparatus is implemented as a chipset or module.

According to the present invention, in a fifth aspect, this object is for example achieved by a system comprising:

a user equipment;
an apparatus according to the third aspect; and
an apparatus according to the fourth aspect.

According to the present invention, in a sixth aspect, this object is for example achieved by a computer program product comprising code means for performing methods steps of a method according to any one of the first and second aspects, when run on a computer.

In this connection, it has to be pointed out that the present invention enables one or more of the following:

Minimum addition of address and control information e.g. to the interface protocols between AF (application function)/P-CSCF and PCRF and between PCRF and PCEF.

Possibility of concentrated STUN message monitoring functionality in a PCEF/GW (gateway).

Possibility of concentrated implementation of PCC rule binding to the STUN encapsulation and encapsulated address and protocol information and to internal 5-tuple between UE and STUN Relay e.g. in the PCEF/GW.

Enabling appliance of service data flow and media stream level policy and charging control (including e.g. bit-rate control and gating), when the STUN Relay for NAT traversal is used e.g. in a policy and/or charging controlled network.

Prevention of access by the UE on the user plane to external destinations not agreed on the signalling/session plane.

Ability to apply policy and charging control in a network simultaneously with the STUN Relay based NAT traversal method known to apply to all kinds of NATs.

BRIEF DESCRIPTION OF THE DRAWINGS

Embodiments of the present invention are described herein below with reference to the accompanying drawings, in which.

DETAILED DESCRIPTION OF EMBODIMENTS OF THE PRESENT INVENTION

The embodiments of the present invention are described herein below by way of example with reference to the accompanying drawings.

It is to be noted that for this description, the terms "(portion of) the internal 5-tuple, (portion of) the external 5-tuple, user equipment, external client, PCEF(GW)/PCRF, PCC rule(s) and encapsulated/non-encapsulated IP DP streams/media streams" are examples for "first address information, second address information, terminal, network traffic destination entity, controlling entity, policy information and network traffic", respectively, without restricting the latter-named terms to the special technical or implementation details imposed to the first-named terms.

First Embodiment

Figure 3:
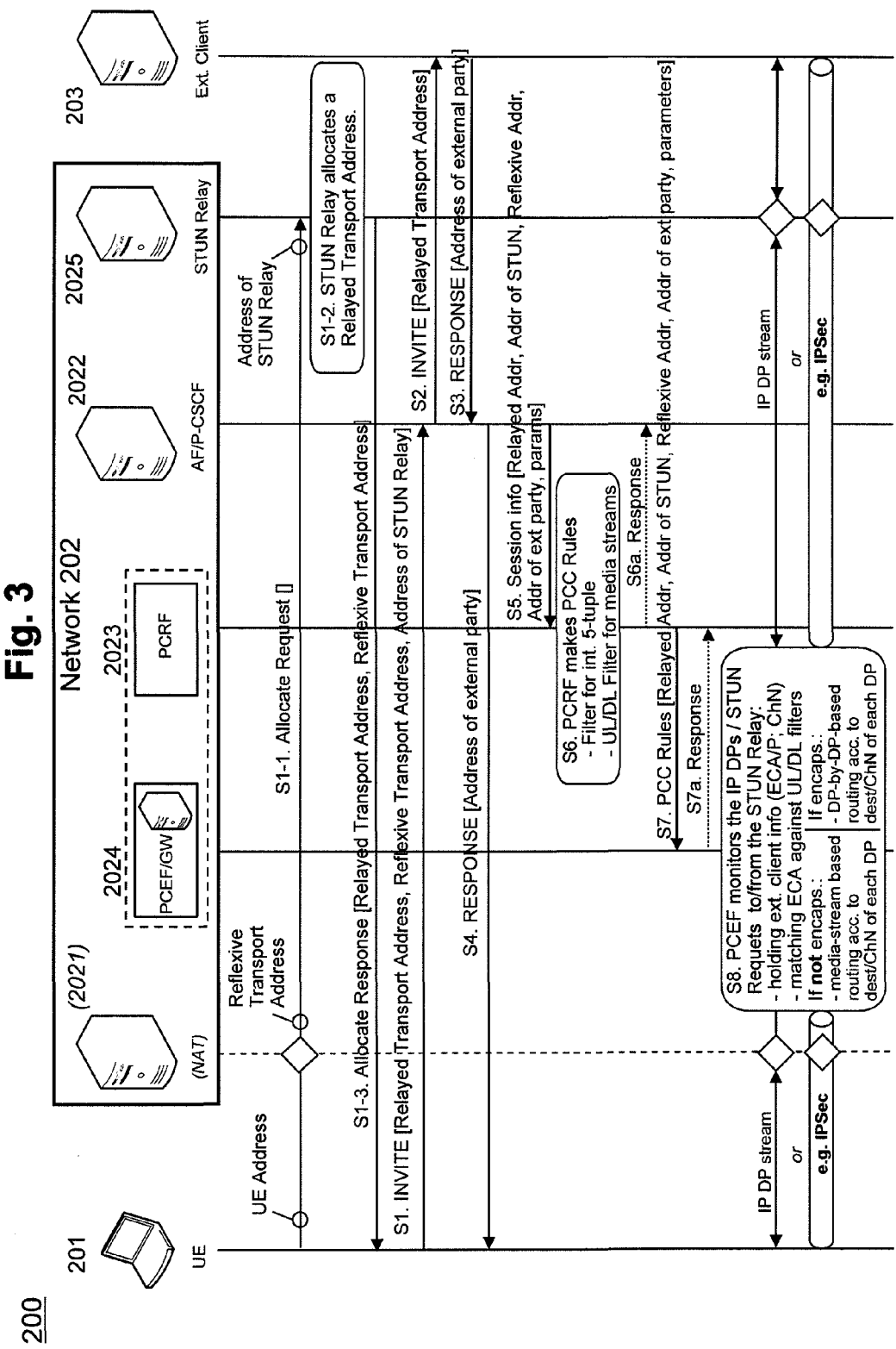
FIG. 3 shows methods for policy control according to the present invention.

FIG. 3 (in conjunction with FIG. 4 to be described later) shows the methods (and apparatuses) according to the first embodiment of the present invention. Signalling between elements is indicated in horizontal direction, while time aspects between signalling may be reflected in the vertical arrangement of the signalling sequence as well as in the sequence numbers. It is to be noted that the time aspects indicated in FIG. 3 do not necessarily restrict any one of the method steps shown to the step sequence outlined. This applies in particular to method steps that are functionally disjunctive with each other, for example, if the relayed transport address to be assigned to the UE 201 is pre-configured or previously stored in the UE 201, a SIP/SDP signalling shown e.g. in steps S1 to S4 to be described later may as well be performed instead of the relayed transport address setup shown in steps S1-1 to S1-3, i.e. the relayed transport address setup may in that case be omitted.

As shown in FIG. 3, a communication system 200 may comprise the UE 201, a network 202 and the external client 203 (or 203' not shown). The network 202 in turn may comprise the optional NAT 2021, an AF/P-CSCF 2022, the PCRF 2023, the PCEF/GW 2024 and the STUN Relay (of Server) 2025. The PCRF 2023 and the PCEF/GW 2024 may also be disposed as an integral entity, as indicated by the dashed box surrounding the functional blocks of the PCRF 2023/PCEF/GW 2024.

In step S1-1, UE 201 may send e.g. a STUN Allocate Request message to the STUN Relay 2025 in order to obtain an external IP address for itself (also referred to as "Relayed Transport Address") from the STUN Relay 2025. In step S1-2, e.g. the STUN Relay 2025 may choose/allocate an address for the UE 201. Then, in step S1-3, the STUN Relay 2025 may send the allocated Relayed Transport Address and the address from which the request was received, e.g. the address allocated by the NAT device 2021 (equals to the Reflexive Transport Address) to the UE 201 e.g. in an Allocate Response STUN Message.

In step S1, e.g. the AF/P-CSCF 2022 may perform receiving first address information (e.g. (portion of) internal 5-tuple) relating to a terminal (e.g. UE 201) and a network traffic relay entity (e.g. STUN Relay 2025). For example, the UE 201 may send e.g. a SIP INVITE message to the AF/P-CSCF 2024 in order to set up a session. The message may contain address information such as the Relayed Transport Address and the Reflexive Transport Address. The UE 201 may also send the IP address and port of the STUN Relay 2025 used in the communication between the UE 201 and the STUN Relay 2025 (also referred to as "Address of STUN Relay").

In steps S2 and S3, e.g. the AF/P-CSCF 2022 may perform obtaining second address information (e.g. (portion of) external 5-tuple) relating to the network traffic relay entity (e.g. STUN Relay 2025) and a network traffic destination entity (e.g. external client 203). For example, in step S2, the AF/P-CSCF 2022 may relay the INVITE message further towards the external client 203. Then, for example, in step S3, the external client 203 may send, to the AF/P-CSCF 2022, a response indicating e.g. the IP address(es) the external client 203 may intend to receive DP IP data packets on (also referred to as "Address of External Party").

Optionally, in step S4, the AF/P-CSCF 2022 may save the above-described address information and send the response message further towards the UE 201.

And, in step S5, e.g. the AF/P-CSCF 2022 may perform sending the first address information (e.g. (portion of) internal 5-tuple) and the second address information (e.g. (portion of) external 5-tuple) to a controlling entity (e.g. the PCEF/GW 2024/PCRF 2023). Accordingly, also in step S5, e.g. the PCRF/GW 2024/PCEF 2023) may perform receiving the first address information (e.g. (portion of) internal 5-tuple) relating to the terminal (e.g. UE 201) and the network traffic relay entity (e.g. STUN Relay 2025), and the second address information (e.g. (portion of) external 5-tuple) relating to the network traffic relay entity (e.g. STUN Relay 2025) and the network traffic destination entity (e.g. external client 203). In other words, for example, e.g. the AF/P-CSCF 2022 may forward the address information to the PCRF 2023 to be used with other session information for making policy and charging rules (PCC rules) for the service data flows of the session.

Then, in step S6, e.g. the PCRF 2023 may perform generating policy information (e.g. PCC rule(s)) based on the received first and second address information. In other words, in step S6, e.g. the PCRF 2023 may generate e.g. PCC rules, to be sent to the PCEF/GW 2024, using e.g. the received IP address/port and/or channel number and session information.

Optionally, in step S6a, the PCRF 2023 may send a response to the AF/P-CSCF 2022. And also optionally, in step S7, e.g. in case the PCRF 2023 and the PCEF/GW 2024 are disposed as separate entities, the PCRF 2023 may send the PCC rules generated to the PCEF/GW 2024, indicating which filter may be the filter of the "Internal 5-Tuple" between the UE 201 (plus e.g. related NAT 2021) and the STUN Relay 2025 and which filters may be media stream filters. In optional step S7a, the PCEF/GW 2024 may send a corresponding response to the PCRF 2023.

Figure 1:
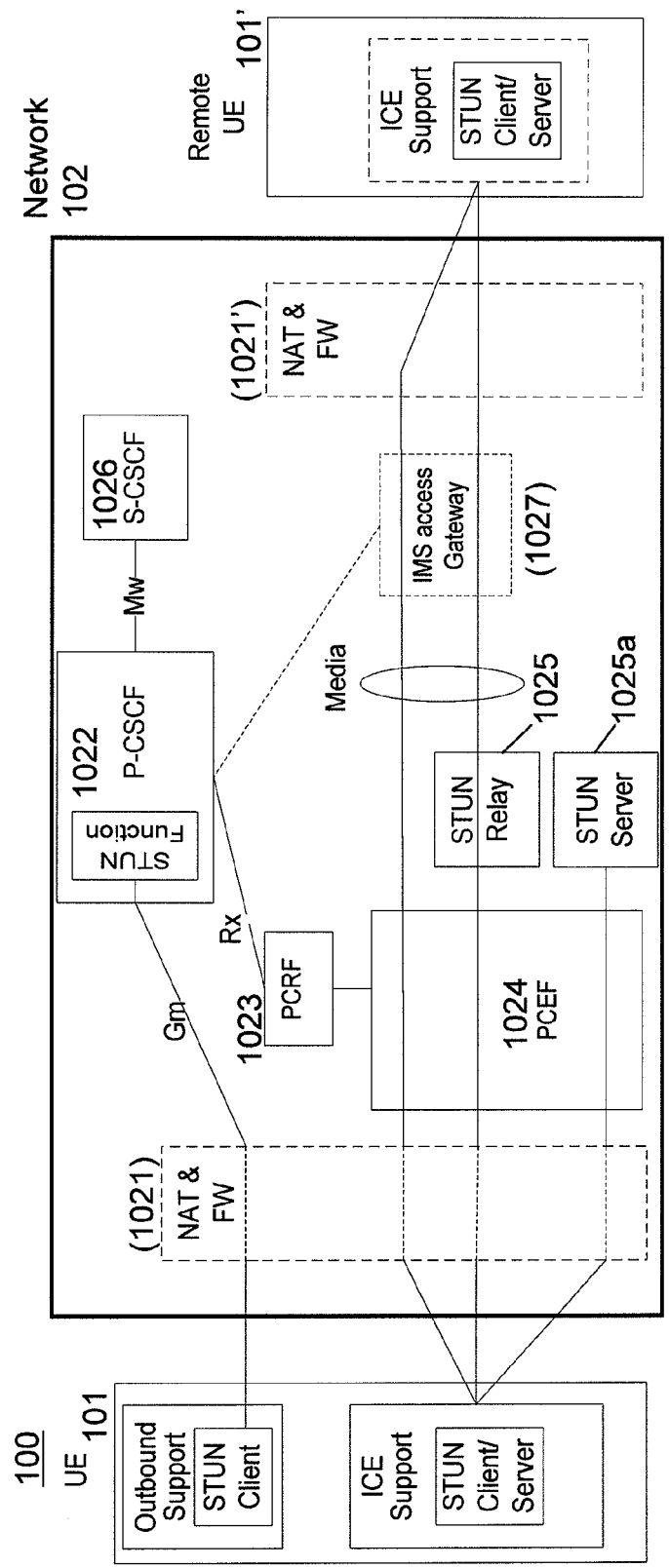
FIG. 1 shows the above-described reference model for ICE and Outbound Methodology.
Figure 2:
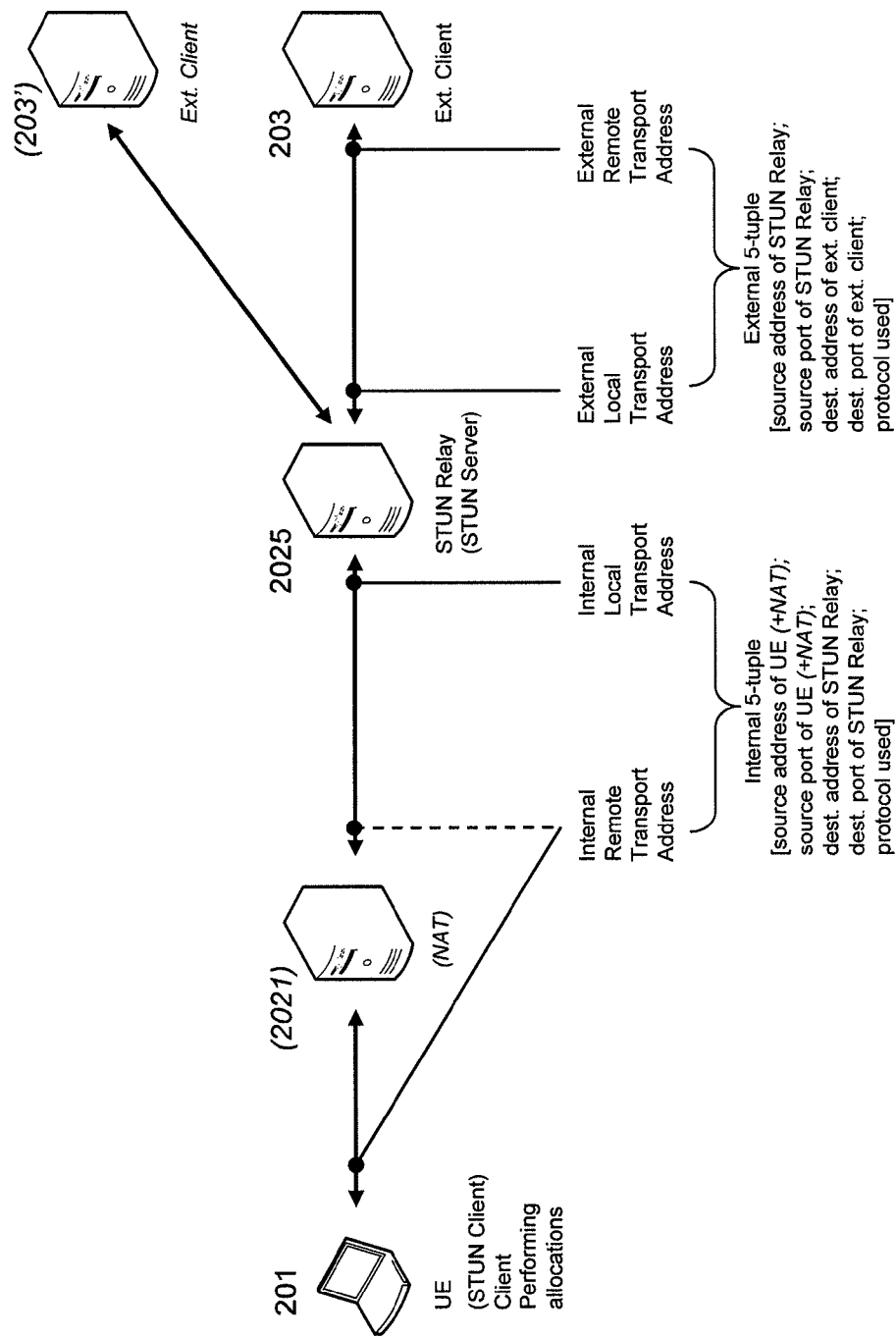
FIG. 2 shows the above-described explanatory view of the tuple terminology.

And, in step S8, e.g. the PCEF 2024 may perform monitoring network traffic (e.g. IP DP/media streams) based on the generated policy information. For example, the PCEF/GW 2024 may monitor (i.e. "policy control") the IP DP data packets to/from the STUN Relay 2025 using the filter of the "Internal 5-Tuple" to find out whether the UE requests from the STUN Relay for an "Active Destination" ("set active destination" as described herein above with reference to FIG. 2) to be set or changed.

According to further refinements of the method relating to the AF/P-CSCF 2022 according to the first embodiment of the present invention, the receiving may comprise receiving (see above step S1) the first address information as at least a portion of a session initiation protocol invite message. In addition, the obtaining may comprise sending (see above step S2) a session initiation protocol invite message relating to an intended network traffic destination entity, and receiving (see above step S3) a session initiation response message relating to the network traffic destination entity responsive to the session initiation protocol invite.

According to further refinements of the method relating to the PCEF/GW 2024/PCRF 2023, the generated policy information may comprise a filter function for network traffic related to the first address information. For example, the filter function may relate to the internal 5-tuple, i.e. reflexive transport address/port and the IP address/port of the STUN Relay 2025 used towards the UE 201, and possibly the protocol used. In addition, the generated policy information may comprise a first filter function (e.g. an uplink media stream filter) for network traffic related to network traffic in a direction from the terminal (e.g. UE 201) to the network traffic destination entity (e.g. external client 203), and/or a second filter function (e.g. a downlink media stream filter) for network traffic related to network traffic in a direction from the network traffic destination entity (e.g. external client 203) to the terminal (e.g. UE 201). For example, concerning the uplink and downlink media filters, in the (UL) uplink the destination address(es)/port(s) may be the ones indicated by the external client 203 during the session signalling, and the source address/port may be the reflexive transport address/port, i.e. address/port seen from the STUN Relay 2025 towards the UE 201 (and the related NAT device 2021). In the DL (downlink), the destination address/port may be the reflexive transport address/port, and the source address(es) may be constructed from the IP address(es)/prefix(es) indicated by the external client 203 e.g. during the session signalling.

In addition to the above, the method related to the PCEF/GW 2024/PCRF 2023 may also comprise detecting an intended change to or addition of another network traffic destination entity (e.g. external client 203' not shown in FIG. 3), and holding destination address information relating to the said other network traffic destination entity based on the detected change. For example, if the PCEF/GW 2024 detects the activation of such a destination, the PCEF/GW 2024 may copy e.g. the REMOTE-ADDRESS (i.e. the IP address/port of the external client 203') and/or related parameters (e.g. a channel number or index) related to the address or destination from the STUN message before forwarding the message.

Moreover, there may also be comprised a matching of the address information against the first and second filter functions, and policy enforcement of the network traffic based on the result of matching. For example, the PCEF/GW 2024 may compare the copied address/port to the media filters in order to check whether the destination requested by the UE 201 may match e.g. the session signalling information.

In addition to the above, there may also be comprised examining, if the result of matching is negative, and if the data packet causes the network traffic relay entity (e.g. STUN Relay) to permit a new destination address, and, if the result of the examining indicates that the data packet causes the network traffic relay entity (e.g. STUN Relay) to permit a new destination address not matching at least one of the first and second filter functions, dropping the data packet or enforcing policy control measures to the data packet. Alternatively, there may also be comprised examining, if the result of matching is negative, and if the data packet is constituted by a simple traversal of user datagram protocol over network address translations message requesting a change of an active destination used by the network traffic relay entity (e.g. STUN Relay) for internet protocol data packets, and, if the result of the examining indicates that the data packet causes the change of the active destination and that the requested destination address does not match at least one of the first and second filter functions, dropping the data packet or enforcing policy control measures to the data packet. In addition, the method related to the PCEF/GW 2024/PCRF 2023 may also comprise, if the result of matching is affirmative, determining that the network traffic is non-encapsulated network traffic, and wherein the policy enforcement may be based on destinations of individual data packets within media streams, and may enforce policy on the non-encapsulated network traffic based on the generated policy information and the held destination address information. For example, if the requested destination matches a media filter, the PCEF/GW 2024 may hold information indicating that the service data flow corresponding to the media filter is transferred non-encapsulated, i.e. not encapsulated e.g. within a STUN message in Send Indication or Data Indication between the UE 201 and the STUN Relay 2025. Consequently, for example, the PCEF/GW 2024 may apply the PCC rule related to this media filter to such non-encapsulated "Active Destination"-related data.

In addition or as an alternative to the above, the method related to the PCEF/GW 2024/PCRF 2023 may also comprise, if the result of matching is negative, determining that the network traffic is non-encapsulated network traffic, and wherein the policy enforcement may be based on destinations of individual data packets within media streams and may restrict the non-encapsulated network traffic based on the generated policy information and the held destination address information. For example, if the requested destination does not match any media filter, the UE 201 may try to access a destination not agreed at session signalling. Consequently, for example, the PCEF/GW 2024 may, e.g. according to a predefined policy, block or restrict the network traffic to/from this destination.

In addition or as a supplement to all above-defined items, the first address information may comprise of a source address of the terminal (and optionally network address translation information), a source port of the terminal (and optionally network address translation information), a destination address of the network traffic relay entity, a destination port of the network traffic relay entity, a protocol to be used between the terminal and the network traffic relay entity, and/or a channel number relating to a media stream. Moreover, the second address information may comprise of a source address of the network traffic relay entity, a source port of the network traffic relay entity, a destination address of the network traffic destination entity, a destination port of the network traffic destination entity, a protocol to be used between the network traffic relay entity and the network traffic destination entity and/or a channel number of a media stream.

[Usage of Channel Numbers]

As mentioned above, the UE 201 may use the same relayed address/port requested from the STUN Relay 2025 for several different media streams of several different destinations by asking a new destination (i.e. external IP address/port) to be added to the set/list of permissions while sending a data packet to the new destination. After that, the UE 201 may also be capable of receiving data packets from the new destination. Consequently, data packets can then be sent to and received from whatever destination using only a single port of the Server Reflexive Address. Different media streams can then be separated from each other by the PCEF/GW 2024 only by closely inspecting the data packets for the destination information.

In addition, the IP DP data packets between the UE 201 and the STUN Relay 2025 may use a channel number (occasionally abbreviated as "ChN" hereinafter) to separate different media streams from each other (and to separate media streams from STUN messages and vice versa).

Therefore, either one of the address/port info and the channel number may be used for separating DP data packets of different destinations from each other (and from STUN messages), e.g. when the PCEF/GW 2024 performs individual inspection of the DP destinations (also referred to as "deep data packet inspection actions") between the UE 201 and the STUN Relay 2025.

Figure 4:
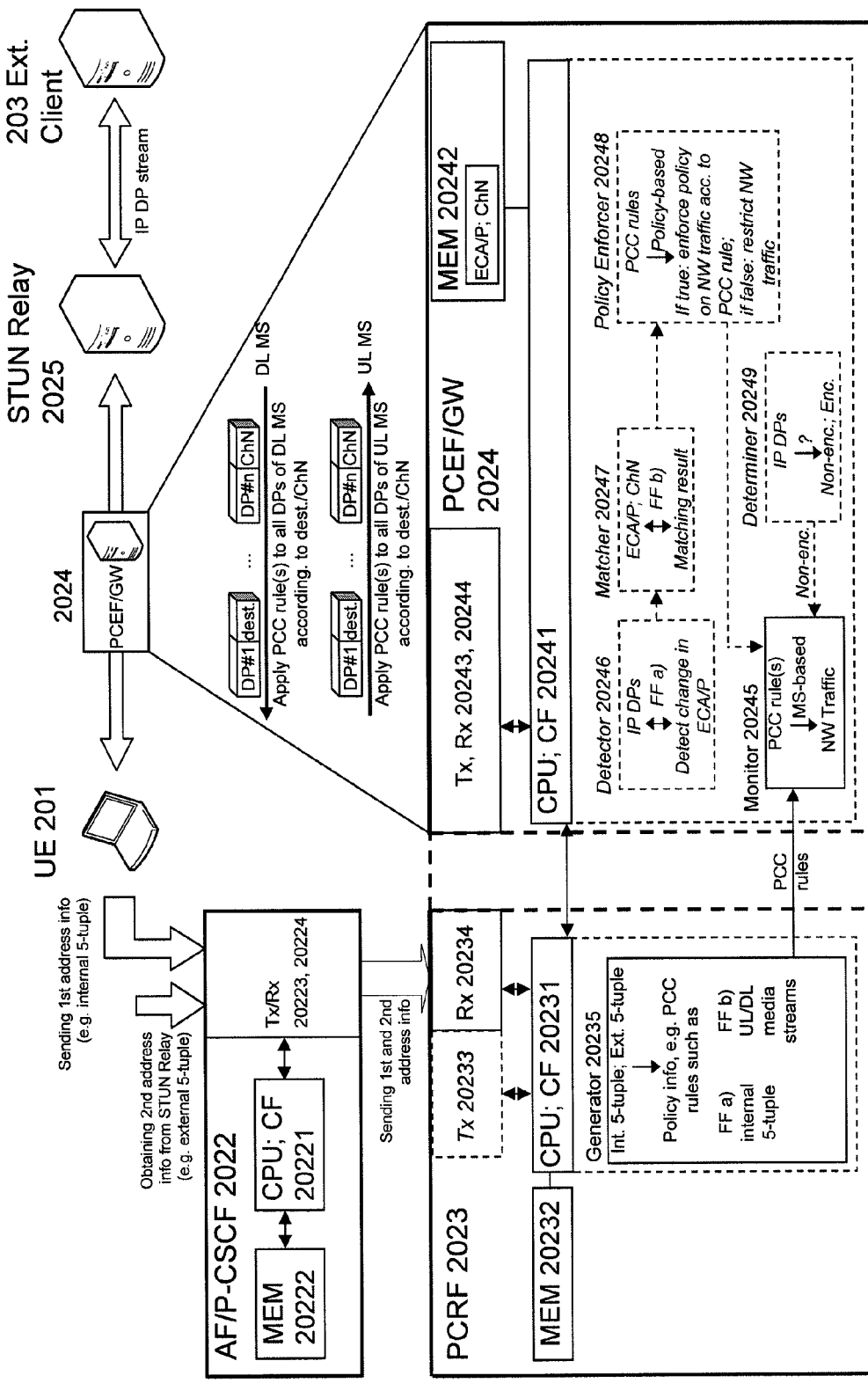
FIG. 4 shows respective apparatuses (e.g. P-CSCF and PCRF/PCEF/GW) for policy control according to a first embodiment of the present invention.

FIG. 4 shows respective apparatuses (e.g. P-CSCF 2022, and PCRF 2023 and/or PCEF 2024) for policy control according to the first embodiment of the present invention. Within FIG. 4, for ease of description, means or portions providing main functionalities are depicted with solid functional blocks and a normal font, while means or portions providing optional functions are depicted with dashed functional blocks and an italic font.

The P-CSCF 2022 may comprise a CPU or core functionality CF (referred to as "CPU" hereinafter) 20221, a memory 20222, an optional sender (or means for sending) Tx 20223 and a receiver (or means for receiving) Rx 20224. The PCRF 2023 may comprise a CPU 20231, a memory 20232, a sender (or means for sending) Tx 20233, a receiver (or means for receiving) Rx 20234 and a generator (or means for generating) 20235. And, the PCEF 2024 may comprise a CPU 20241, a memory 20242 e.g. for holding an external client address/port (abbreviated "ECA/P" hereinafter) and/or a channel number ("ChN"), a sender (or means for sending) Tx 20243, a receiver (or means for receiving) Rx 20244, a monitor (or means for monitoring) 20245, an optional detector (or means for detecting) 20246, an optional matcher (or means for matching) 20247, an optional policy enforcer (or means for policy enforcement) 20248 and an optional determiner (or means for determining) 20249. As indicated by the dashed extensions of the functional blocks of the CPUs 20231 and 20241, the means for generating 20235, the means for monitoring 20245, the means for detecting 20246, the means for matching 20247, the means for policy enforcement 20248 and the means for determining 20249 may be functionalities running on the CPUs 20231 and 20241 or may alternatively be separate functional entities or means. Furthermore, all the means 20235 and 2024 to 20249 are interchangeably disposable between the PCRF 2023 and the PCEF/GW 2024, in case the PCRF 2023 and the PCEF/GW 2024 are disposed as separate entities or as a single/combined entity.

The CPUs $20x1$ (wherein x=22, 23, and 24) may respectively be configured to process various data inputs and to control the functions of the memories $20x2$, the senders $202x3$ and the receivers $20x4$ (and the means for generating 20235 of the PCRF 2023 as well as the means for monitoring 20245, the means for detecting 20246, the means for matching 20247, the means for policy enforcement 20248 and the means for determining 20249 of the PCEF/GW 2024). The memories $20x2$ may respectively serve e.g. for storing code means for carrying out e.g. the respective method according to the invention, when run on the CPUs $20x1$. It is to be noted that the (optional) senders $20x3$ and the (optional) receivers $20x4$ may alternatively be provided as respective integral transceivers (as shown e.g. in the transceiver 20243, 20244 of PCEF/GW 2024). In turn, those transceivers may also be disposed as separate senders and receivers. It is further to be noted that the senders/receivers may be implemented i) as physical senders/receivers for transceiving e.g. via the air interface (e.g. in case of UE 201 towards the P-CSCF 2022), or ii) as routing entities e.g. for sending/receiving data packets e.g. in a PS network (e.g. between the P-CSCF 2022 and the PCRF 2023 or between PCRF 2023 and the PCEF/GW 2024 when disposed as separate network entities), or iii) as functionalities for writing/reading information into/from a given memory area (e.g. in case of shared/common CPUs or memories e.g. of PCRF 2023 and PCEF/GW 2024 when disposed as an integral network entity), or iv) as any suitable combination of i) to iii).

Furthermore, as indicated by the dashed connections between the functional blocks of the PCRF 2023 and the PCEF/GW 2024, it is to be noted that the PCRF 2023 and the PCEF/GW 2024 may also be implemented as an integral/combined entity, as mentioned above. In that case, the CPUs 20231, 20241, the memories 20232, 20242, the (optional) senders 20233, 20243 and the receivers 20234, 20244 may respectively be common and/or shared resources.

For example, the means for receiving 20224 of the P-CSCF 2023 may be configured to receive the first address information (e.g. (portion of) internal 5-tuple) relating to the terminal (e.g. UE 201) and the network traffic relay entity (e.g. STUN Relay 2025). For example, the UE 201 may send e.g. a SIP INVITE message to the AF/P-CSCF 2024 in order to set up a session. The message may contain address information such as the Relayed Transport Address and the Reflexive Transport Address. The UE 201 may also send the IP address and port of the STUN Relay 2025 used in the communication between the UE 201 and the STUN Relay 2025 (also referred to as "Address of STUN Relay").

Then, e.g. the CPU 20221 in conjunction with the memory 20222, the means for sending 20223 and the means for receiving 20224 may be configured to obtain the second address information (e.g. (portion of) external 5-tuple) relating to the network traffic relay entity (e.g. STUN Relay 2025) and the network traffic destination entity (e.g. external client 203). For example, e.g. the means for sending/receiving 20223, 20224 of the AF/P-CSCF 2022 may relay the INVITE message further towards the external client 203. Then, for example, the external client 203 may send a response, to the P-CSCF 2022, indicating e.g. the IP address(es) the external client 203 may intend to receive DP IP data packets on (also referred to as "Address of External Party").

And, e.g. the means for sending 20223 of the P-CSCF 2022 may be configured to send the first address information and the second address information to a controlling entity (e.g. PCEF/GW 2024/PCRF 2023). Then, e.g. the means for receiving 20234 of the PCRF 2023 may be configured to receive the first address information (e.g. (portion of) internal 5-tuple) relating to the terminal (e.g. UE 201) and the network traffic relay entity (e.g. STUN Relay 2025), and the second address information (e.g. (portion of) external 5-tuple) relating to the network traffic relay entity (e.g. STUN Relay 2025) and a network traffic destination entity (e.g. external client 203). In other words, for example, e.g. the means for sending 20223 of the AF/P-CSCF 2022 may be configured to forward the address information to the means for receiving 20234 of the PCRF 2023 to be used with other session information for generating policy and charging rules (PCC rules) in the means for generating 20235 for the service data flows of the session.

Then, e.g. the means for generating 20235 of the PCRF 2023 may be configured to generate policy information based on the first and second address information received by the means for receiving 20234. In other words, e.g. the means for generating 20235 of the PCRF 2023 may generate e.g. PCC rules, to be sent to the means for receiving 20244 of the PCEF/GW 2024, using e.g. the received IP address/port and/or channel number and session information.

And, e.g. the means for monitoring 20245 of the PCEF/GW 2024 may be configured to monitor network traffic based on the policy information generated by the means for generating. For example, e.g. the means for monitoring 20245 of the PCEF/GW 2024 may monitor (i.e. "policy control") the IP DP data packets to/from the STUN Relay 2025 using the filter of the "Internal 5-Tuple" to find out whether the UE requests from the STUN Relay for an "Active Destination" ("set active destination" as described herein above with reference to FIG. 2) to be set or changed.

According to further refinements of the AF/P-CSCF 2022 according to the first embodiment of the present invention, the means for receiving may further be configured to receiving the first address information as at least a portion of a session initiation protocol invite message. In addition, the means for obtaining may be constituted by the means for sending 20223 configured to send a session initiation protocol invite message relating to an intended network traffic destination entity, and by the means for receiving 20224 configured to receive a session initiation response message relating to the network traffic destination entity responsive to the session initiation protocol invite.

According to further refinements of the PCEF/GW 2024/PCRF 2023, the means for generating 20235 may further be configured to generate policy information comprising a filter function for network traffic related to the first address information. For example, the filter function may relate to the internal 5-tuple, i.e. reflexive transport address/port and the IP address/port of the STUN Relay 2025 used towards the UE 201, and possibly the protocol used. In addition, the means for generating 20235 may further be configured to generate policy information comprising a first filter function (e.g. an uplink media stream filter) for network traffic related to network traffic in a direction from the terminal (e.g. UE 201) to the network traffic destination entity (e.g. external client 203), and/or a second filter function (e.g. a downlink media stream filter) for network traffic related to network traffic in a direction from the network traffic destination entity (e.g. external client 203) to the terminal (e.g. UE 201). For example, concerning the uplink and downlink media filters, in the (UL) uplink the destination address(es)/port(s) may be the ones indicated by the external client 203 during the session signalling, and the source address/port may be the reflexive transport address/port, i.e. address/port seen from the STUN Relay 2025 towards the UE 201 (and the related NAT device 2021). In the DL (downlink), the destination address/port may be the reflexive transport address/port, and the source address(es) may be constructed from the IP address(es)/prefix(es) indicated by the external client 203 e.g. during the session signalling.

In addition to the above, the PCEF/GW 2024/PCRF 2023 may also comprise the means for detecting 20246 configured to detect an intended addition of or change to another network traffic destination entity (e.g. external client 203' not shown in FIG. 4), and means for holding 20242 configured to hold destination address information relating to the another network traffic destination entity based on the detected change. For example, if e.g. the means for detecting 20246 of the PCEF/GW 2024 detect the activation of such a destination, e.g. the CPU 20241 of the PCEF/GW 2024 may copy e.g. the REMOTE-ADDRESS (i.e. the IP address/port of the external client 203') and/or related parameters (e.g. a channel number or index) related to the address or destination from the STUN message before forwarding the message e.g. to the means for holding (or memory) 20242.

Moreover, the PCEF/GW 2024 may also comprise the means for matching 20247 configured to match the address information against the first and second filter functions, and the means for policy enforcement 20248 configured to enforce policy on the network traffic based on the result of matching. For example, e.g. the means for matching 20247 of the PCEF/GW 2024 may compare the copied address/port to the media filters (FF b)) in order to check whether the destination requested by the UE 201 may match e.g. the session signalling information.

In addition to the above, the PCEF/GW 2024 may also comprise means for examining 202410, if the result of matching is negative, and if the data packet causes the network traffic relay entity (e.g. STUN Relay) to permit a new destination address, and means for dropping (constituted e.g. by the CPU 20241) or means 20248 for enforcing policy control measures to the data packet, if the result of the examining indicates that the data packet causes the network traffic relay entity (e.g. STUN Relay) to permit a new destination address not matching at least one of the first and second filter functions. Alternatively, the PCEF/GW 2024 may also comprise the means for examining 202410, if the result of matching is negative, and if the data packet is constituted by a simple traversal of user datagram protocol over network address translations message requesting a change of an active destination used by the network traffic relay entity (e.g. STUN Relay) for internet protocol data packets, and means for dropping (constituted e.g. by the CPU 20241) or means 20248 for enforcing policy control measures to the data packet, if the result of the examining indicates that the data packet causes the change of the active destination and that the requested destination address does not match at least one of the first and second filter functions. In addition, the PCEF/GW 2024/PCRF 2023 may also comprise the means for determining 20249 configured to determine, if the result of matching is affirmative, that the network traffic is non-encapsulated network traffic, and the means for policy enforcement 20248 may be configured to enforce policy based on destinations of individual data packets within media streams, and to enforce policy on the non-encapsulated network traffic based on the policy information generated by the means for generating 20235 and the destination address information held by the means for holding 20242. For example, if the requested destination matches a media filter, e.g. the means for holding (or memory) 20242 of the PCEF/GW 2024 may be configured to hold information indicating that the service data flow corresponding to the media filter is transferred non-encapsulated, i.e. not encapsulated e.g. within a STUN message in Send Indication or Data Indication between the UE 201 and the STUN Relay 2025. Consequently, for example, e.g. the means for monitoring 20245 in conjunction with the means for policy enforcement 20248 of the PCEF/GW 2024 may be configured to apply the PCC rule related to this media filter to such non-encapsulated "Active Destination"-related data.

In addition or as an alternative to the above, the means for determining 20249 of the PCEF/GW 2024/PCRF 2023 may further be configured to determine, if the result of matching is negative, that the network traffic is non-encapsulated network traffic, and the means for policy enforcement 20248 may be configured to enforce policy based on destinations of individual data packets within media streams and to restrict the non-encapsulated network traffic based on the policy information generated by the means for generating 20235 and the destination address information held by the means for holding 20242. For example, if the requested destination does not match any media filter, the UE 201 may try to access a destination not agreed at session signalling. Consequently, for example, e.g. the means for monitoring 20245 in conjunction with the means for policy enforcement 20248 of the PCEF/GW 2024 may, e.g. according to a predefined policy, block or restrict the network traffic to/from this destination.

The first and second address information may comprise all items already indicated in conjunction with the description of FIG. 3.

Second Embodiment

Figure 5:
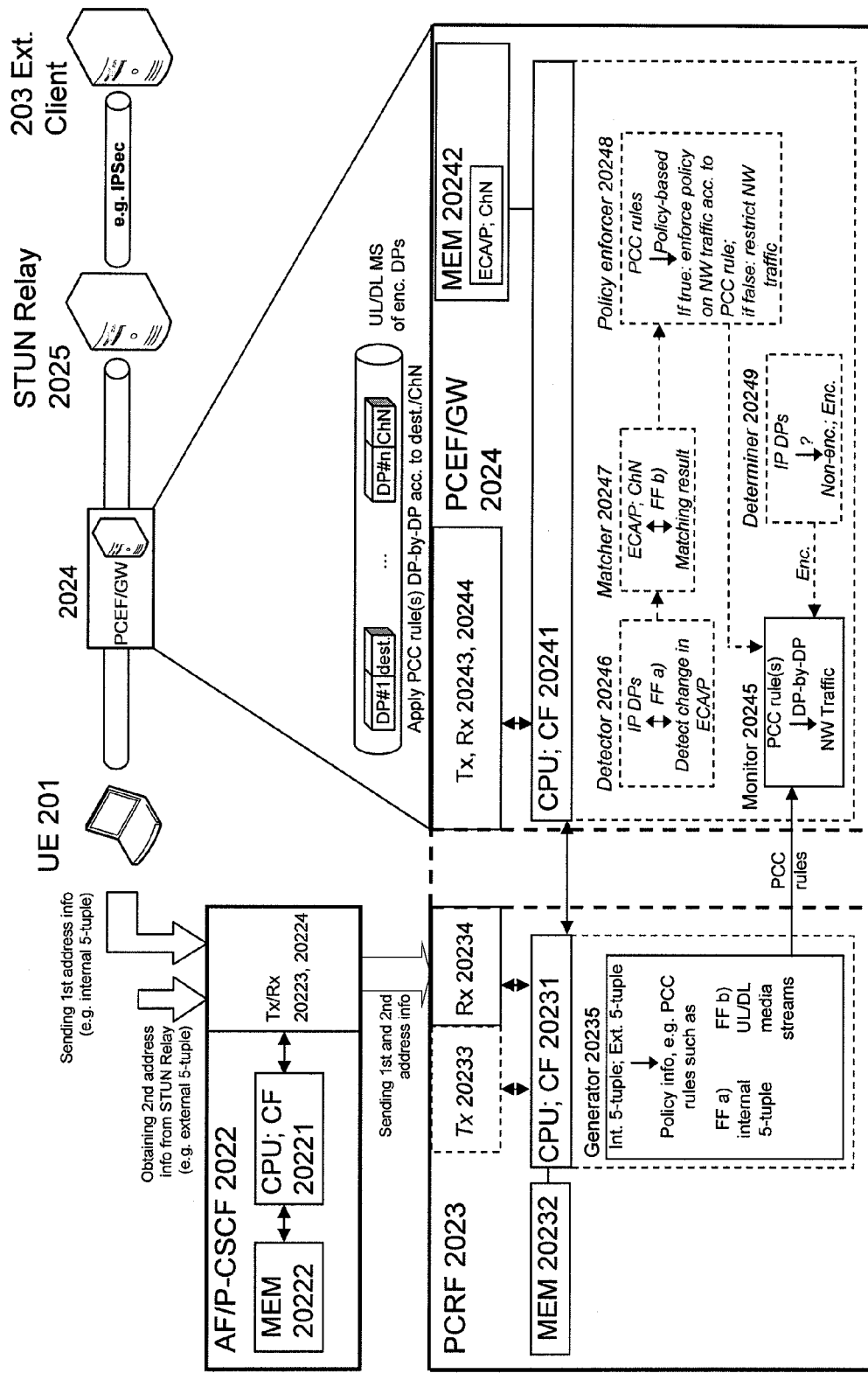
FIG. 5 shows respective apparatuses (e.g. P-CSCF and PCRF/PCEF/GW) for policy control according to a second embodiment of the present invention.

With reference to FIGS. 3 and 5, the second embodiment of the present invention is described herein below. It is to be noted that the second embodiment comprises all method and apparatus features of the first embodiment with the exception of usage of encapsulated network traffic. Therefore, only a detailed description of means or portions different from the means or portions of the first embodiment is provided herein below.

As for the method related to the PCEF/GW 2024, there is further comprised determining whether the network traffic is encapsulated network traffic, and, if so, the policy enforcement is based on destinations of individual data packets on a data packet-by-data packet basis for enforcing policy on the encapsulated network traffic based on the generated policy information and the held destination address information.

As for the PCEF/GW 2024, the means for determining 20249 is further configured to determine whether the network traffic is encapsulated network traffic, and, if so, the means for monitoring 20245 in conjunction with the means for policy enforcement 20248 is further configured to enforce policy based on destinations of individual data packets on a data packet-by-data packet basis for enforcing policy on the encapsulated network traffic based on the policy information generated by the means for generating 20235 and the destination address information held by the means for holding 20242.

For example, for all encapsulated media streams, e.g. the (means for) monitoring 20245 (step S8) is configured to monitor/monitors the STUN Relay encapsulation messages to find the remote address/port and/or related parameters (e.g. a channel number or index) related to the remote address or destination in the message. This way, e.g. the (means for) detecting 20249 of the PCEF/GW 2024 may be configured to detect/detects the IP data packets of individual service data flows and media streams from the encapsulation, thus enabling adaption of relevant PCC rules and gating to the streams.

Without being restricted to the details following in this section, the first and second embodiments of the present invention may be summarized as follows: All previous approaches apply policy control only to the "Internal 5-Tuple" between the UE and the STUN Relay, and not to the individual media streams/service data flows, missing an essential issue and giving the UE 201 a possibility to uncontrollably access destinations 203 not agreed upon the session signalling.

Therefore, in order to be able to apply policy and charging control to individual service data flows/media streams in the above described conditions, the following actions are proposed:

The UE sends to the AF/P-CSCF the external IP address (allocated by the STUN Relay to the UE) and the reflexive transport address sent to the UE by the STUN Relay. The UE may also send the IP address and port of the STUN Relay used in the communication between the UE and the STUN Relay (a general solution), or this may be known e.g. through configuration.

The AF/P-CSCF gets the IP address(es) and port(s) of the external party from the session signalling (e.g. SIP/SDP offer/answer exchange).

The AF/P-CSCF forwards the address information to the policy and charging rules function (PCRF) to be used with other session information for making policy and charging rules (PCC rules) for the service data flows of the session.

The PCRF makes PCC rules, to be sent to the policy and charging enforcement function (PCEF), using the received IP address and port and session information. The rules include filters:

For the "Internal 5-Tuple", i.e. reflexive transport address and port and the IP address and port of the STUN Relay used towards the UE, and possibly the used protocol.

The uplink and downlink media filters.
In uplink the destination address(es) and port(s) are the ones indicated by the external party during the session signalling, and the source address and port is the reflexive transport address and port, i.e. address and port seen from the STUN Relay towards the UE and the related NAT device.

In downlink the destination address and port is the reflexive transport address and port, and the source address(es) are constructed from the IP address(es) or prefix(es) indicated by the external party during the session signalling.

The PCRF sends the PCC rules to the PCEF, indicating which filter is the filter of the "Internal 5-Tuple" between the UE (plus related NAT) and the STUN Relay and which filters are media stream filters.

The PCEF/GW monitors (i.e. "policy controls") the IP data packets to/from the STUN Relay using the filter of the "Internal 5-Tuple" to find out whether the UE requests from the STUN Relay for an "Active Destination" to be set or changed.

If the PCEF detects the activation of a destination, the PCEF copies the REMOTE-ADDRESS (i.e. the IP address and port of the external party) from the STUN message before forwarding the message.

The PCEF compares the copied address and port to the media filters to check whether the destination requested by the UE matches the session signalling information.

If the requested destination matches a media filter, the PCEF knows that the service data flow corresponding to the media filter will be transferred non-encapsulated, i.e. not encapsulated within a STUN message in Send Indication or Data Indication between the UE and the STUN Relay. Consequently, the PCEF will apply the PCC rule related to this media filter to the not encapsulated, "Active Destination" related data.

If the requested destination does not match any media filter, the UE is trying to access a destination not agreed at session signalling. The PCEF may, e.g. according to predefined policy, block or restrict the traffic to/from this destination, or enforce some other policy control measures to the data packet to prevent a not allowed action.

For all encapsulated media streams the PCEF monitors the STUN Relay encapsulation messages to find the remote address and port in the message. This way the PCEF detects the IP data packets of individual service data flows and media streams from the encapsulation and is able to adapt relevant PCC rules and gating to the streams. If the UE tries to add a new address/destination to the set of permissions (i.e. as an allowed new destination), the PCEF checks whether the address information (address, port, possibly protocol, etc.) matches any of the filters or address information agreed at session signaling. If there is no match, the PCEF may drop the data packet or enforce some other policy control measures to the data packet to prevent a not allowed action.

Modification of the First and Second Embodiments

Figure 6:
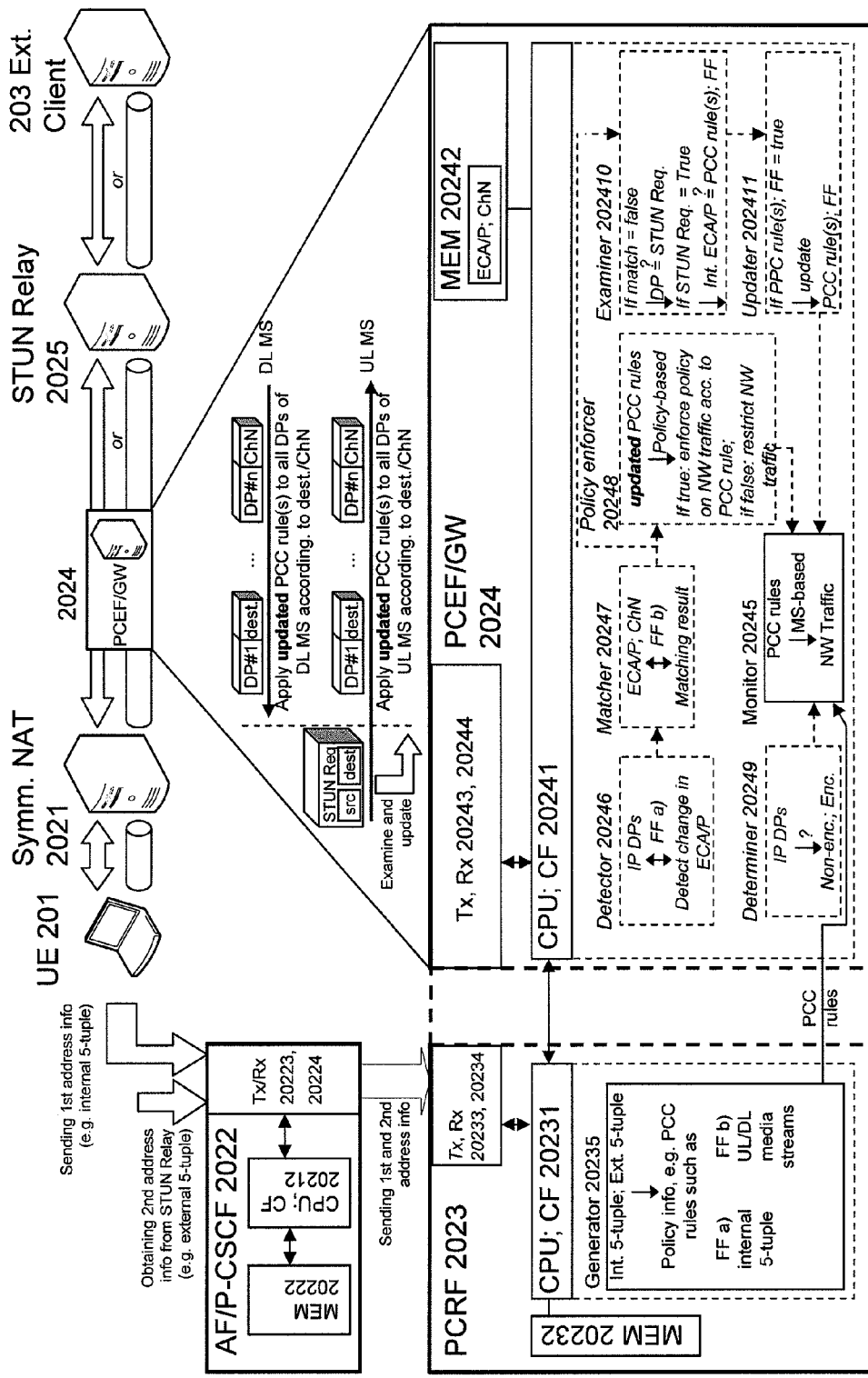
FIG. 6 shows respective apparatuses (e.g. P-CSCF and PCRF/PCEF/GW) for policy control according to a modification of the first and second embodiments of the present invention.

With reference to FIGS. 3 and 6, the modification of the first and second embodiments of the present invention is described herein below. It is to be noted that the modification comprises all method and apparatus features of the first and second embodiments with the exception of additional means/steps for coping with a request message (e.g. a STUN request message from the UE 201). Therefore, only a detailed description of means or portions different from the means or portions of the first and second embodiments is provided herein below.

The same principle of closely inspecting the IP data packet (referred to as "deep data packet inspection") for filtering the data packets, as described herein above with reference to the first and second embodiments, is applied to this additional STUN/ICE related problem caused by a symmetric NAT device.

The PCEF/GW 2024 may additionally comprise an examiner (or means for examining) 202410 and an updater (or means for updating) 202411. As indicated by the dashed extensions of the functional block of the CPU 20241, the means for examining 202410 and the means for updating 202411 may be functionalities running on the CPU 20241 or may alternatively be separate functional entities or means. Furthermore, the means for examining 202410 and the means for updating 202411 are interchangeably disposable between the PCRF 2023 and the PCEF/GW 2024, in case the PCRF 2023 and the PCEF/GW 2024 are disposed as separate entities or as a single/combined entity.

In addition, there is now also disposed the symmetrical NAT 2021 between UE 201 and the STUN Relay 2025. Such a symmetrical NAT 2021 will establish a new binding (i.e. allocate a new address/port) when the UE 201 sends an IP data packet to an address different from the STUN Relay address. "Symmetrical NAT" means in this context an NAT in which all requests from the same internal IP address and port, to a specific destination IP address and port, are mapped to the same external IP address and port. If the same UE 201 sends a data packet with the same source address and port, but to a different destination, a different mapping is used. Furthermore, only the external client 203 that receives a data packet can send a UDP data packet back to the internal host.

Consequently, when the UE 201 has received so-called (ICE) candidate addresses and performs connectivity checks by exchanging e.g. STUN requests/responses with the external client 203 directly (i.e. the data packets do not pass the STUN Relay 2025), those new bindings generated by the NAT 2021 for these IP data packets are not known to the PCEF/GW 2024. The PCEF/GW 2024 has got only the filters (e.g. addresses/ports) that were exchanged at SIP/SDP signalling earlier (see steps S1 to S7 according to FIG. 3). With no filters set for the new bindings, i.e. the source (e.g. source address of UE 201) being wrong/unknown, the PCEF/GW 2024 may block the connectivity check IP data packets (which carry e.g. STUN Requests) sent by the UE 201 towards the external client 203 and the related response data packets.

As for the method related to the PCEF/GW 2024, there is further comprised first examining, if the result of matching is negative, whether a data packet is constituted by a destination change request message (e.g. a STUN Request Message) comprising a source address of the terminal and indicating a network traffic destination entity. And, there is comprised second examining, if the result of the first examining is affirmative, whether the indicated network traffic destination entity accords with the policy information and/or the first and second filter functions. Finally, an updating is performed, if the result of the second examining is affirmative, of the first and second filter functions with the source address of the terminal (e.g. UE 201).

As for the PCEF/GW 2024, the means for examining 202410 may be configured to examine, if the result of matching is negative, whether a data packet is constituted by a destination change request message (e.g. a STUN Request Message) comprising a source address of the terminal (e.g. UE 201) and indicating a network traffic destination entity (e.g. external client 203), to examine, if the result of the examining of the data packet is affirmative, whether the indicated network traffic destination entity accords with the policy information and/or the first and second filter functions. Furthermore, the means for updating 202411 may be configured to updated, if the result of the means for examining is affirmative, the first and second filter functions with the source address of the terminal (e.g. UE 201).

For example, a solution according to the present invention is provided. When e.g. the means for receiving 20234 of the PCEF/GW 2024 receives, from the UE 201, an IP data packet that does not match any filter, e.g. the means for examining 202410 of the PCEF/GW 2024 may inspect the data packet closely to find out whether the data packet may be a STUN (Request) message, and even more accurately, a STUN (Request) message sent to a destination that is available in the existing filters and/or PCC rules. Separation of the STUN messages can be performed e.g. by the "channel number" described above. If the data packet is a STUN (Request) message, the PCEF/GW 2024 may pass the IP DP through. Otherwise, the IP DP is dropped. Then, e.g. the means for updating 202411 of the PCEF may update the filter functions with the source address information of the passed-through data packet to allow further IP data packet exchange through the new binding.

As indicated in FIG. 6 with bold-printed "updated"s, the (means for) policy enforcement 20248 in conjunction with the (means for) monitoring 20245 may then be able to apply the updated PCC rule(s) and/or filter functions to the UL/DL media streams.

According to the first and second embodiments as well as the modification, the network traffic relay entity may be constituted by a simple traversal of user datagram protocol through network address translations relay (STUN) server. In addition, the network traffic destination entity may be constituted by an external client. Finally, the controlling entity may be constituted by a gateway function, a policy and charging rules function and a policy and/or charging enforcement function.

Furthermore, the P-CSCF 2022 and/or the PCEF/GW 2024/PCRF 2023 may be implemented as a chipset or module.

Finally, the present invention also relates to a system which may comprise a user equipment, the P-CSCF 2022 and/or the PCEF/GW 2024/PCRF 2023.

Further Embodiments

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line, e.g. DSL (Digital Subscriber Line).

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at the P-CSCF and/or PCEF/GW/PCRF, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. P-CSCF and/or PCEF/GW/PCRF) can be implemented as individual devices, units or means, but this does not exclude that they are implemented in a distributed fashion throughout the system, as long as the functionality of the device, unit or means is preserved.

LIST OF ABBREVIATIONS

3GPP 3$^{rd}$ generation partnership project
AF Application function
ALG Application level gateway
CN Core network
CSCF Call session control function
P-CSCF Proxy CSCF
I-CSCF Interrogating CSCF
S-CSCF Serving CSCF
GW Gateway
ICE Interactive connectivity establishment
IETF Internet engineering task force
IM IP multimedia
IMS IP multimedia subsystem
IP Internet protocol
MGW Media gateway
NAT Network address translation
PCC Policy and charging control
PCEF Policy and charging enforcement function
PCRF Policy and charging rules function
PLMN Public land mobile network
PS Data packet switched
SDP Session description protocol
SIP Session initiation protocol
STUN Simple Traversal of User Datagram Protocol (UDP) through NAT(s)
TISPAN Telecommunications and Internet Converged Services and Protocols for Advanced Networking
TR Technical report
TS Technical specification
UE User equipment

The invention claimed is:

1. A method, comprising:
receiving, at an apparatus, a first kind of address information related to at least one of service data flows, media streams, and data packets relayed between a terminal and one of an external client and server;
receiving, at the apparatus, a second kind of address information used for data transmission of said at least one of service data flows, media streams, and data packets;
monitoring, at the apparatus, data traffic between the terminal and a relay entity based on policy information related to the first and second kind of address information;
detecting, at the apparatus, a used transmission scheme between the terminal and the relay entity;
holding, at the apparatus, address information of the at least one of service data flows, media streams, and data packets in the data transmission; and
enforcing, at the apparatus, by using the first kind of address information, policy control to the at least one of service data flows, media streams, and data packets by matching the first kind of address information against the address information of the at least one of service data flows, media streams, and data packets.

2. The method according to claim 1, wherein the detecting further comprises monitoring the data transmission between the terminal and the relay entity, and detecting the address information of the at least one of service data flows, media streams, and data packets in the data transmission based on the detected data transmission scheme to support address translation between the terminal and the relay entity.

3. The method according to claim 1, further comprising examining, if the result of matching is negative, whether a data packet is constituted by a simple traversal of user datagram protocol over network address translations request message comprising a source address of the terminal and indicating a network traffic destination entity, and examining, if the result of the examining of the data packet is affirmative, whether the indicated network traffic destination entity accords with at least one of the policy information and at least one for the first kind of address and filter functions, and updating, if the result of the examining is affirmative, at least one of the first kind of address and filter functions with at least one of the source address and a port of the terminal.

4. The method according to claim 1, further comprising examining, if the data packet causes the relay entity to permit a new destination address, and dropping the data packet, if the result by the examining indicates that the data packet causes the relay entity to permit a new destination address not matching at least one of the first kind of address and filter functions.

5. The method according to claim 1, further comprising examining, if the data packet causes the relay entity to permit a new destination address, wherein the enforcing comprises passing the data packet through, if the result by the examining indicates that the data packet causes the relay entity to permit a new destination address matching at least one of the first kind of address and filter functions.

6. The method according to claim 1, further comprising: generating the policy information based on the received first and second kinds of information; and determining whether the network traffic is encapsulated network traffic, and, if so, the enforcing further comprises enforcing policy on individual at least one of service data flows, media streams and data packets inside the encapsulation based on the policy information generated and the destination address information.

7. The method according to claim 1, wherein the first kind of address information comprises at least one of a source address of the terminal, a source port of the terminal, a destination address of the relay entity, a destination port of the relay entity, a protocol to be used between the terminal and the relay entity and a channel number relating to a media stream.

8. The method according to claim 7, wherein at least one or the source address of the terminal and the source port of the terminal further comprises network address translation information.

9. The method according to claim 1, wherein the second kind of address information comprises at least one of a source address of the relay entity, a source port of the relay entity, a reflexive destination address of the terminal entity, a reflexive destination port of the terminal entity, a protocol to be used between the relay entity and the terminal entity and a channel number relating to a media stream.

10. An apparatus, comprising:
   at least one processor;
   at least one memory including computer program code;
   the at least one memory and the computer program code configured to, with the at least one processor, cause the apparatus at least to:
   receive a first kind of address information related to the at least one of service data flows, media streams, and data packets relayed between a terminal and one of an external client and server;
   receive a second kind of address information used for data transmission of said at least one of service data flows, media streams, and data packets;
   monitor data traffic between the terminal and a relay entity based on policy information related to the first and second kind of address information;
   detect a used transmission scheme between the terminal and the relay entity;
   hold address information of the at least one of service data flows, media streams, and data packets in the data transmission; and
   enforce by using the first kind of address information, policy control to the at least one of service data flows, media streams, and data packets by matching the first kind of address information against the address information of the at least one of service data flows, media streams, and data packets.

11. The apparatus according to claim 10, wherein the apparatus is further configured to: support address translation between the terminal and the relay entity and detect by monitoring the data transmission between the terminal and the relay entity, and to detect the address information of the at least one of service data flows, media streams, and data packets in the data transmission based on the detected data transmission scheme.

12. The apparatus according to claim 10, wherein the apparatus is further configured to examine, if the result of matching is negative, whether a data packet is constituted by a simple traversal of user datagram protocol over network address translations request message comprising a source address of the terminal and indicating a network traffic destination entity, and for examining, if the result of the examining of the data packet is affirmative, whether the indicated network traffic destination entity accords with at least one of the policy information and at least one for the first kind of address and filter functions, and updating, if the result of the examining is affirmative, at least one of the first kind of address and filter functions with at least one of the source address and a port of the terminal.

13. The apparatus according to claim 10, wherein the apparatus is further configured to examine, if the data packet causes the relay entity to permit a new destination address, and to drop the data packet, if the result by the examining indicates that the data packet causes the relay entity to permit a new destination address not matching at least one of the first kind of address and filter functions.

14. The apparatus according to claim 10, wherein the apparatus is further configured to examine, if the data packet causes the relay entity to permit a new destination address, and is further configured to enforce the policy control to pass the data packet through, if the result of examining indicates that the data packet causes the relay entity to permit a new destination address matching at least one of the first kind of address and filter functions.

15. The apparatus according to claim 10, wherein the apparatus is further configured to: generate the policy information based on the received first and second kinds of information; and determine whether the network traffic is encapsulated network traffic, and, if so, the apparatus is further configured to enforce policy on individual at least one of service data flows, media streams and data packets inside the encapsulation based on the policy information generated and a destination address information that is held.

16. The apparatus according to claim 10, wherein the first kind of address information comprises at least one of a source address of the terminal, a source port of the terminal, a destination address of the relay entity, a destination port of the relay entity, a protocol to be used between the terminal and the relay entity and a channel number relating to a media stream.

17. The apparatus according to claim 16, wherein at least one of the source address of the terminal and the source port of the terminal further comprises network address translation information.

18. The apparatus according to claim 10, wherein the second kind of address information comprises at least one of a source address of the relay entity, a source port of the relay entity, a reflexive destination address of the terminal entity, a reflexive destination port of the terminal entity, a protocol to be used between the relay entity and the terminal entity and a channel number relating to a media stream.

19. The apparatus according to claim 10, wherein the terminal is constituted by a user equipment.

20. The apparatus according to claim 10, wherein the relay entity is constituted by a simple traversal of user datagram protocol through network address translations relay server.

21. The apparatus according to claim 10, wherein the apparatus is constituted by at least one of a gateway function, a policy and charging rules function and a policy and charging enforcement function.

22. The apparatus according to claim 10, wherein the apparatus is implemented as a chipset or module.

23. A system, comprising:
   an apparatus comprising;
   at least one processor;
   at least one memory including computer program code;
   the at least one memory and the computer program code configured to, with the at least one processor, cause the apparatus at least to:
   receive a first kind of address information related to the at least one of service data flows, media streams, and data packets relayed between a terminal and one of an external client and server;
   receive a second kind of address information used for data transmission of said at least one of service data flows, media streams, and data packets;

monitor data traffic between the terminal and a relay entity based on policy information related to the first and second kind of address information;

detect a used transmission scheme between the terminal and the relay entity;

hold address information of the at least one of service data flows, media streams, and data packets in the data transmission; and enforce by using the first kind of address information, policy control to the at least one of service data flows, media streams, and data packets by matching the first kind of address information against the address information of the at least one of service data flows, media streams, and data packets; and an application function or proxy call state control function that cause the system at least to:

receive the first kind of address information;

obtain the second kind of address information; and send the first and second kinds of address information to the apparatus.

24. A non-transitory computer memory comprising code to cause at least one processor to perform operations, the operations comprising:

receiving a first kind of address information related to the at least one of service data flows, media streams, and data packets relayed between a terminal and one of an external client and server;

receiving a second kind of address information used for data transmission of said at least one of service data flows, media streams, and data packets;

monitoring data traffic between the terminal and a relay entity based on policy information related to the first and second kind of address information;

detecting a used transmission scheme between the terminal and the relay entity;

holding address information of the at least one of service data flows, media streams, and data packets in the data transmission; and enforcing, by using the first kind of address information, policy control to the at least one of service data flows, media streams, and data packets by matching the first kind of address information against the address information of the at least one of service data flows, media streams, and data packets.

* * * * *